United States Patent Office 3,392,004
Patented July 9, 1968

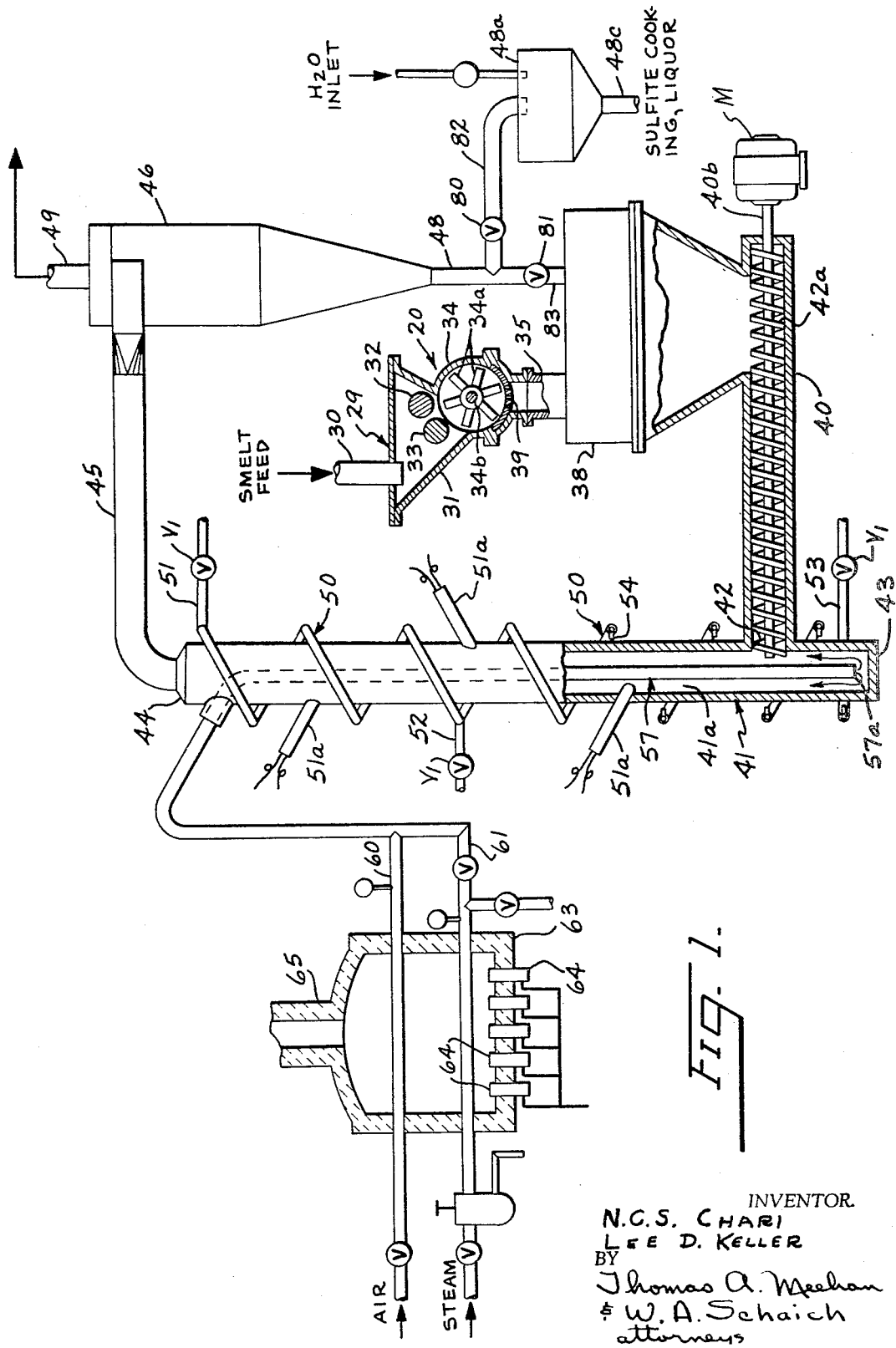

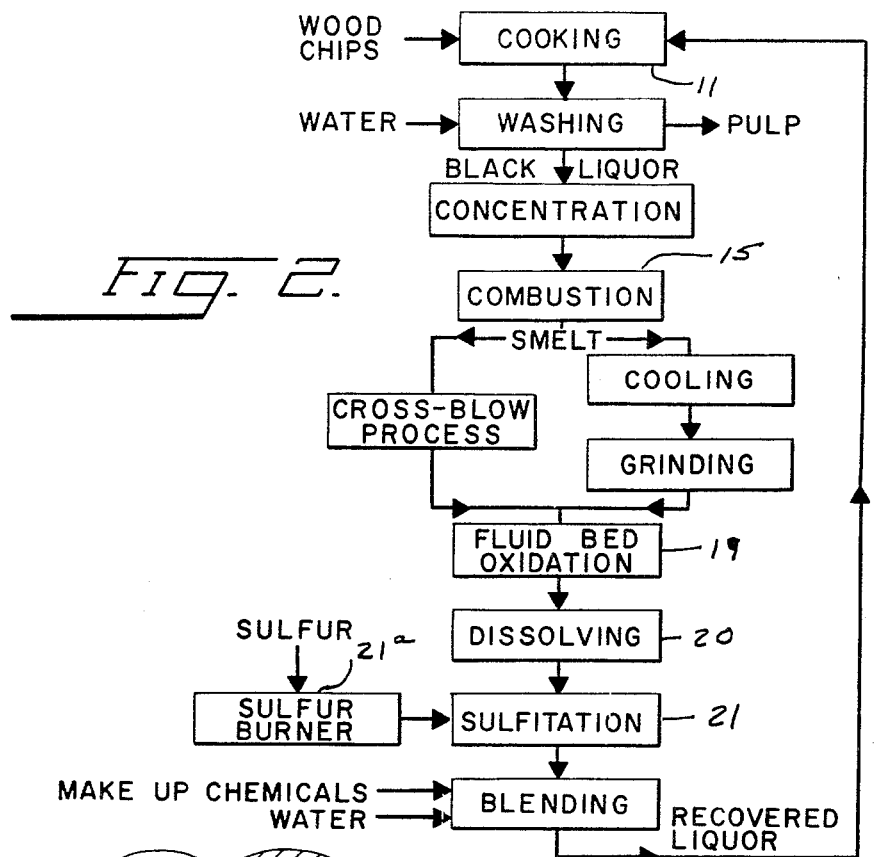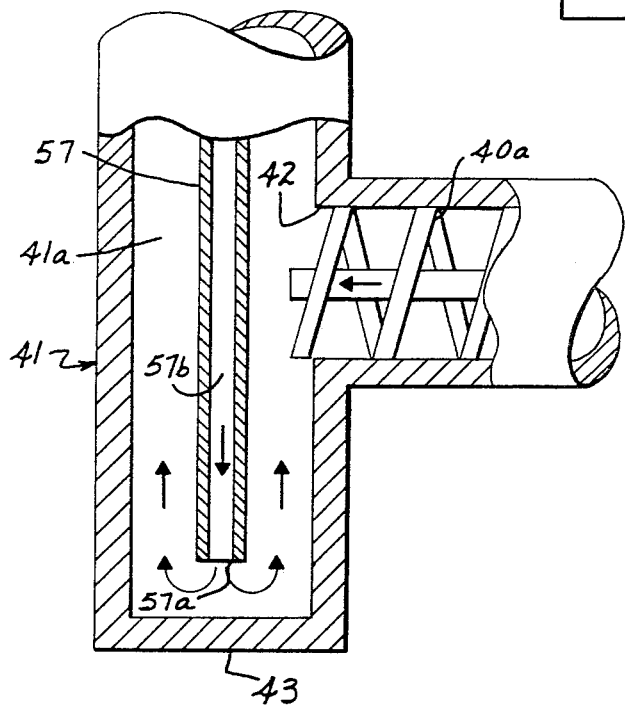

3,392,004
RECIRCULATION SYSTEM FOR TREATING SPENT PULPING LIQUOR SMELT TO RECOVER SODIUM VALUES AS ACTIVE SODIUM SULFITE
Nallan C. S. Chari, Toledo, and Lee D. Keller, Waterville, Ohio, assignors to Owens-Illinois, Inc., a corporation of Ohio
Filed Dec. 24, 1964, Ser. No. 420,962
4 Claims. (Cl. 23—284)

The present invention relates to improved apparatus of general utility in carrying out "fluidized bed" operations.

The "fluidized bed" technique has become an extremely important tool and has achieved the status of a unit operation in the chemical processing industry, as well as others. The "fluidized bed" operation, broadly considered, envisions a technique for effecting intimate contact between a solid and a fluid, usually a gas, in order to achieve some change in one or the other. The gas may be a petroleum fraction undergoing refining, fractionation, cracking, catalysis, or the like, possibly to rearrange molecular configuration. In such case, the solids may be selected by reason of possessing a high surface area or it may have a catalyst thereon or it may be a catalyst itself. Generally, the solids must be fairly uniformly and finely divided. In very rudimentary fashion, the "fluidized bed" may be considered as a large mass of the finely divided solids in an upstanding elongated chamber in which a gaseous medium is introduced from the bottom at a uniform rate sufficient to cause the solids to expand and to bubble turbulently, as it were, within the chamber. A very efficient physical contact between the gas and the solids is thus obtained. This phenomenon is very beneficial in a number of processes.

The "fluidized bed" technique is employed in the iron and steel industry in the coking of coal, in hydrocarbon synthesis in top of the blast furnace, in the direct reduction of metal oxides and in the production of cheap oxygen for metallurgical operations. It is also used in the dyestuff industry, for example, in the chlorination of phthalocyanine pigments, in the reduction of nitrobenzene to aniline, in the nitration of benzene and toluene and in the production of phthalic anhydride from naphthalene. It is also used for roasting or arseno-pyrite as a preparatory step for the gold recovery by cyanidation. Fluidization as a technique finds ready application in the calcination of limestone and the manufacture of cement from oil shale. Other applications include the production of phthalic anhyride from naphthalene, the cracking of formamide to yield hydrogen cyanide, the production of vinyl chloride from ethylene ($C_2H_2$) and hydrochloric acid, the manufacture of ethylene oxides from a mixture of ethylene and air and the oxidation of butenes to maleic acid. It is also used is the fluid bed reduction and fluorination of uranium.

Conventionally, the gaseous medium is introduced to the fluid bed reactor (the elongate upstanding chamber mentioned herein-above) at the bottom via a tubular side conduit fluidly communicating with the bottom of the reactor. It is also conventional to provide a support for the solids near the bottom of the reactor and for this purpose multi-orifice plates, screens and/or sintered porous screens or plates of various constructions are used. Unfortunately, these supports are very much subject to becoming plugged with solids such that the pressure drop increases, effecting the costs of the operation and, more often than not, complete shutdown until the multi-orifice support or the like plate can be cleaned out. This, of course, takes time and adds more cost to the particular process being conducted in the reactor.

Present "fluid bed" apparatus are also beset with the problem which is commonly referred to as "channeling." This results in inefficient mass contact between the gas and the solid. Channeling occurs for a number of reasons, one of which involves the plugging up referred to, causing restriction to flow in several parts of the porous plate or screen employed as a lower support for the finely divided solids. Another way of looking at it is that when channeling exists, the cross sectional area of the reactor is not being utilized to its full capacity.

It is a general object of the present invention to provide novel apparatus employing features of construction which avoid the plugging, pressure drop and/or attendant shutdown normally associated with conventional support plates for solids in "fluidized bed" apparatus employed heretofore.

It is a particular object of the present invention to provide a novel apparatus of simplified construction, yet providing extremely efficient initial and continuing converging contact between the gaseous medium and the finely divided solid medium desirably brought together for a fluidization reaction or operation.

It is still another object of the present invention to provide a novel apparatus for conduct of "fluidized bed" operations therein which is characterized by very low pressure drops there-across and absence of channeling.

The apparatus of the present invention will be described herein particularly in connection with a sulfur recovery method, of utility in the pulping industry. In the chemical pulping of wood chips to form paper, sulfur chemicals, usually an active one, such as sodium sulfite, are utilized as a digesting liquor for attacking wood chips in order to remove encrustations, lignins and other complex long chain organic constituents of the wood. The digestion operation usually takes place in a pressure vessel where, in effect, a cooking operation takes place during which the liquor becomes progressively rich in organic sulfonates and sodium salts of organic acids at the expense of the original sodium sulfite constituents of the cooking liquor. Sodium carbonate and sodium sulfide are usually present in large proportions in the digesting liquor after the digesting operation has been completed. These are not particularly efficient in terms of effecting attack of the wood chips as described. Accordingly, it is desirable to convert the carbonate and sulfide to more active sodium sulfite. These spent liquors which are removed from the digester are desirably, as indicated, converted to sodium sulfite. It is known in this regard that the spent liquor, so-called, containing organic sulfonate and salts of organic acids can be concentrated in multiple effect evaporators to effect removal of a large proportion of the water. Then the concentrate is introduced as a spray into a furnace designed for the combustion of such liquors. In the combustion furnace, the final water content is "flashed" off, the organic material is burned, and the inorganic material converted to sodium sulfide and sodium carbonate which gather in the bottom as a molten smelt.

The apparatus of the present invention finds very particular utility in the conversion of the aforesaid smelt into active sodium sulfite which can be reintroduced into the digester together with wood chips.

It will be appreciated that the wood chips, after digestion, are transported as a pulp to various washers and thence collected on the Fourdrinier wire as a layer of cellulose fibers from which the water is removed by suction and thence by heat until a thin layer of paper of self-supporting nature is ultimately formed, which is thence rolled onto a mandrel in continuous or endless fashion.

One of the problems inherent in the recovery of the sulfur chemicals is that the conversion of the sulfide and carbonate to sulfite is accompanied by the production of an undesirable fraction of sodium thiosulfate having the formula $Na_2S_2O_3$. The chemically active digesting liquor should be composed of a predominant fraction of sodium sulfite having the formula $Na_2SO_3$. Thiosulfate is undesired since this is accompanied by higher overall chemical losses. Additionally, the presence of thiosulfate accelerates corrosion problems in connection with the materials of construction normally involved in the paper mill.

As is presently practiced in the direct sulfitation systems, essentially all of the sulfur is lost in the process. Fifty percent of the sulfur is lost in the form of hydrogen sulfide discharged from the reaction or digesting tower and fifty percent is lost in the recovery furnace. Direct sulfiting of sodium sulfide and the contemporaneously occurring sodium carbonate is inefficient since the sulfiting with $SO_2$ necessarily results in a production of inert sodium thiosulfate which is a dead load resulting in excess sodium losses. On the other hand, the present invention will permit the efficient and direct oxidation of sodium sulfide to sodium sulfite; any unreacted sodium carbonate being capable of being thence directly sulfited by $SO_2$ to additional sodium sulfite.

Accordingly, it may be stated that a specific object of the present invention is to provide an improved apparatus for recovering sulfur chemicals from the semi-chemical, particularly sulfite, pulping process.

It is a particular object of the present invention to provide an apparatus capable of converting the sulfide containing smelt into sulfite in a highly efficient and practical manner.

It is a specific object of the present invention to provide an apparatus which is ideally suited for effecting efficient oxidation of sodium sulfide in particulate form and being of special utility since the apparatus is adapted to being combined into existing sulfiting pulping apparatus.

While the present invention will be described with particular reference to the recovery of sulfide chemicals issuing from a smelt recovery furnace, it will be appreciated that the apparatus herein described has utility in a variety of broader applications wherein it is desired to either oxidize, dry or convey finely divided particulate materials in order to effect a drying or oxidation thereof to a further state. It is a necessary factor of the present invention that the sodium sulfite, or other materials desirably oxidized, be reduced to an extremely finely divided state and particularly the particulate finely divided solid be of relatively uniform particle size.

It is additionally an object of the present invention to provide an apparatus which promotes intimate contact between a gas and a solid, and particularly an apparatus which is not subject to pressure build up since plugging and clogging associated with conventional "fluidized bed" apparatus is avoided.

Stated most simply, the apparatus of the present invention, which is of special utility in "fluidized bed" operations, is composed of an elongate chamber having at least one end wall, a delivery conduit for fluidizing medium being in part within said chamber, said conduit having an inlet and an outlet, said outlet facing said end wall of the chamber and, additionally, means for delivering solids to the chamber at a point proximate but spaced from the conduit outlet.

It is a particular feature of the apparatus in accordance with the present invention that the conduit issues the stream of incoming fluidizing medium against the end wall of the reactor whereby the medium hits the end wall and then flows reversely along, usually up, the elongate axial length of the reactor and immediately contacts solids, in finely divided form, being introduced laterally into the reactor chamber whereupon the finely divided solids are entrained in the fluidizing medium and carried upward in fluidized fashion to define any degree of fluidization depending upon the rate of flow of the fluidizing medium. Thus, the flow may be nominal such as to provide a small percent expansion of the normal height of the solids as would exist in the absence of the fluidizing medium. More conversely, the fluidizing medium can be introduced at such a rate that solids are carried, in the case of the upstanding reactor, upwardly at a rate commensurate with the time residence which is desired for the particular operation. In the recovery of the sulfur chemicals, the solids represent the solidified smelt, as will be described in more detail hereinafter, as once they have been finely divided, it is desired to carry them into the reactor and thence upwardly therethrough and out, but while they are in the reactor they are in intimate turbulent fluidizing contact with the oxidizing gas; namely, air.

The details of the apparatus of the present invention will become more apparent from the detailed description following. Also, the objects enumerated hereinabove, as well as objects more remote thereto, will become apparent from the detailed description to follow taken in conjunction with the annexed sheets of drawings on which there is presented a preferred embodiment of the present invention.

In the drawings:

FIG. 1 is a side elevation view, partly in section, of an apparatus including a fluidized bed apparatus; the apparatus in total being shown in setup for a treatment of smelt to convert the sulfur chemicals therein to sodium sulfite.

FIG. 2 is a block outline flow diagram representation of a pulping operation including the improved sulfur chemical recovering technique in accordance with one embodiment of the present invention.

FIG. 3 is an enlarged sectional view of one portion of the fluid bed apparatus shown in FIG. 1.

Referring now more specifically to the drawings and by way of introduction, there is shown in FIG. 2 a block outline flow diagram generally illustrating the pulping operation using the direct oxidation system. At the top of FIG. 2, it can be seen that wood chips are introduced into a cooking step 11 together with recovered cooking liquor for attacking the binding elements, etc. After cooking for a given time, the spent liquor and digested chips are sent to a washing step wherein the pulp fibers are separated and the waste cooking liquors proceed to a concentration step and thence to a combustion recovery furnace 15. The smelt proceeding from the recovery furnace can proceed in either of two directions, either to a cooling and grinding step or to a fluid cross blow process and thence to the oxidizing apparatus of the present invention identified as a fluid bed oxidation step 19. The oxidized sulfur chemicals, principally in the form of sodium sulfite and the inert sodium carbonate, then proceed to a dissolving tank 20 where water is combined therewith and thence to a sulfitation step 21 to convert the sodium carbonate to sodium sulfite, by introduction of $SO_2$ proceeding from sulfur burner 21a. Thence, the recovered chemicals proceed to a blending tank where water and make-up chemicals are added to adjust the solution to the proper chemical consistency and the resultant blend is recycled to the cooking or digesting step as at 11.

Referring now to FIG. 1, there is disclosed an apparatus ideally adapted for converting sodium sulfide to sodium sulfite. The reference numeral 29 identifies a Wiley mill composed of an inlet 30, a feed hopper 31, guide rolls 32 and 33 and a circular chamber 34 containing a plurality of rotating impact bars 34a extending radially from a driven drive shaft 34b. Beneath the abrasion bars 34, an outlet 35 extends down into a feed hopper 38. Between the outlet 35 and the impact bars 34, there is situated a screen 39 containing suitable sized openings, e.g., screen size, as to pass the desired finely divided particulate form of the smelt which is introduced in lump form into the inlet 30. The finely divided smelt in the hopper 38 then falls by gravity into a tubular screw conveyor 40 which transports the particulate sulfide laterally to the left to dump it into an elongated vertical tube 41 via the lateral opening 42. The screw conveyor contains an internal screw 40a rotating via shaft 40b connected to motor M. The upstanding tube 41 includes a closed bottom wall 43 and an outlet 44 at the top which connects to a conduit 45 which extends laterally to the right to a cyclone separator 46. From the cyclone separator, the now-oxidized product proceeds through a bottom outlet 48 which extends downwardly, then laterally to a hold tank 48a. Valved water inlet 48b delivers water metered to the product at a rate yielding a sulfite liquor which exits through outlet 48c to the digester or to a make-up tank. An upper outlet 49 conveys excess gases and fines to a scrubber and hence to any suitable stack. Valves 80 and 81 in lines 82 and 83, respectively, are suitably controllable to direct a material from outlet 48 to the hopper 38 for recycle or to the tank 48a. In accordance with a preferred embodiment, the upstanding cylindrical reactor tube 41 has arranged thereabout a helical burner tube 50 equipped with vertically spaced valved inlets 51 (top), 52 (middle) and 53 (bottom) for controlled induction of a mixture of fuel gas and air. The burner tube 50 is provided with a plurality of orifices 54 which are aimed at the exterior surface of the tube 41.

Situated axially within the tube 41 is a hollow tube 57 which enters laterally proximate the upper outlet 44 and terminates, below the feed inlet 42 in an open end 57a. The tube 57, in the nature of a distributor tube, connects exteriorly of the reactor tube 41 with a valved air inlet 60 and a valved steam inlet 61, both of which proceed through a preheater furnace 63. The latter has a plurality of burner elements 64 along its bottom and a vent outlet 65 above. Suitable stream traps and valves are included and controlled to deliver a mixture of hot steam and air in proportions and for a purpose as will be described hereinafter.

The reactor tube 41, as just described, is well adapted to receive a continuous supply of particulate solids via the screw conveyor 40 through the inlet 42, while simultaneously a predetermined supply of air and steam is introduced at the top via tube 57 proceeding axially downwardly within tube 41 to a position beneath the feed inlet 42 and thence in uninterrupted fashion into the tube 41 near the bottom 43. The steam and air then reverses direction to flow upwardly in the annular chamber or zone 41, defined by the space 41a between the reactor tube 41 and distributor tube 57 which are in concentric relationship. The air and steam gas rate is controlled relative to the rate and particle size of the ground sulfide feed so that the particulate solids are entrained in the hot gas and proceed upwardly and turbulently, providing efficient solid/gas contact, e.g., defining a so-called "fluidized bed" or "fluidized state," preferably characterized by a minimum of vertical migration by individual particles in relation to adjacent particles. Stated otherwise, the particles should proceed uniformly up the annular space but, at the same time, turbulently with respect to immediately surrounding gas. The helically coiled burner 54 serves to very efficiently control the temperature of the entire "bed" of fluidized or entrained particles, which extend from the bottom of the conduit 41 near the inlet 42 all the way to the outlet 44 at the top. Each of the fuel gas/air inlets 51, 52 and 53 for the helical burner coil are individually valved for careful control of the temperature in order to meet the particular situation at different levels. It will be appreciated that probe thermocouples 51a (3 shown) may be inserted into the annular chamber 41a and these connected to suitable temperature controllers (not shown), in turn controlling the valves $V_1$ of inlets 51, 52 and 53 for metered control of fuel gas/air mixture entering the helical coil.

Example I

An apparatus as illustrated in FIG. 1 was constructed in which the fluidized bed reactor tube 41 consisted of a hollow schedule 40 pipe having a diameter of 1½" and a length of 45½". The air and steam distributor pipe 57 is composed of a ¼" diameter schedule 40 pipe entering through a side section at the top of the reactor 41. The distributor tube extended downwardly to terminate in an open end 57a spaced about ½" from the bottom wall 43. A helical coil 50 fabricated of a ¼" copper tubing surrounded the reactor tube 41 and is provided with a plurality of holes 54 measuring 0.05" in diameter, drilled so as to face the reactor. A charge of molten smelt was collected from the bottom of a combustion furnace to which was fed a spray of concentrated residual black liquor from pulp digesters of a paper mill. The smelt was cooled and crushed to a fineness of particle size, as follows, expressed as mesh (United States Bureau of Standards) corresponding to mass percent.

| Mesh (U.S.B.S.): | Mass (percent) |
|---|---|
| −30 +40 | 12.2 |
| −40 +50 | 17.5 |
| −50 +70 | 17.4 |
| −70 +100 | 16.5 |
| −100 +140 | 15.6 |
| −140 +200 | 10.4 |
| −200 +270 | 6.4 |
| −270 +400 | 4.0 |
| Total | 100.0 |

Of this, the fraction of the charge between −70 +140 corresponding to an average particle size of 0.0062 inch diameter was charged to the reactor 41 via the screw conveyor 40. The charge of smelt had an analyzed composition as set forth in Table 1, column F expressed as a mole fraction of ingredients listed. The fuel gas/air mixture fed to the helical coil burner 50 was controlled so that the flame issuing from holes 54 provided a uniform temperature within the reactor tube of 1100° F. for the approximate 10-minute run. The air supply line 60 measured 20 pounds per square inch gauge, while the steam flow rate was 85 grams per minute at 15 pounds per square inch gauge. Table 1 also lists in column P the mole fraction of the same components as determined by analysis of the recovered product produced for the 10-minute run.

TABLE 1

| Component | Mole Fractions [M.F.] | |
|---|---|---|
| | Feed (F) | Product P |
| $Na_2S$ | 0.2610 | 0.0086 |
| $Na_2SO_3$ | 0.0133 | 0.2546 |
| $Na_2SO_4$ | 0.0250 | 0.0379 |
| $Na_2CO_3$ | 0.6974 | 0.6884 |
| $Na_2S_2O_3$ | 0.0033 | 0.0105 |
| | 1.0000 | 1.0000 |

The particle fed to the fluidized bed reactor measured, on an average, 0.006 diameter in inches. The density of the particle was 134 pounds per cubic foot. As can be seen from Table 1, the oxidized product P was composed principally of sodium sulfite [$Na_2SO_3$, M.F.=0.2546] and sodium carbonate [$Na_2CO_3$, M.F.=0.6884]. The analysis of the product as shown in Table 1 compared with the feed F reveals a calculated conversion to sodium sulfite of 93.6%.

Thus, percent conversion to $Na_2SO_3$ $$=\frac{100}{0.261}\left[\frac{0.6974}{0.6884}\times 0.2546-0.0133\right]=93.6\%$$

It is a particular feature of the apparatus of the present invention that the design as disclosed in FIG. 1 features a distributor tube 57 having a completely open bottom outlet end 57a, thus avoiding the clogging and plugging normally attendant the use of multi-orifice plates, screens or sintered porous plate(s), usually employed in connection with fluidized bed systems in which the fluidizing medium is introduced at the bottom of the reactor. As described earlier herein, the apertures or orifices associated with these plates, screens and like devices become plugged, whereby the pressure drop increases and the efficiency of the fluidization, oxidation, or the like, drops rapidly.

In Example I described just above, the conversion of the smelt to sulfite involved a heat of reaction in the neighborhood of 173,000 calories per mole at a reaction temperature 1100° F. This heat was partially absorbed, in accordance with another desirable feature of the present invention, by the incoming air and steam which proceeded through the inner distributor tube 57 extending from the top of the reactor tube 51, as shown in FIG. 2, to the bottom, therefore providing a more uniform temperature distribution [thereby preventing overheating of the bed], more uniform oxidation and further reduction of the chance of plugging or clogging.

It is another feature of the present invention that the solid particulate material is fed laterally from a supply hopper maintained with an adequate supply of the finely divided smelt, thereby precluding entrapment of air which would otherwise interfere with the fluidization phenomena occurring in the reactor tube 41.

Example II

Utilizing the apparatus described in Example I, a number of runs similar to that described in Example I were carried out at different temperatures and different feed rates for the smelt. The latter was effected by using a constant batch feed of 250 parts of smelt but varying the time of the run. These runs are summarized in Table 2 below.

TABLE 2

| Run No. | Temp. (° F.) | Steam/Air Volumetric Ratio | Time (min.) | Percent Conversion to— | | |
|---|---|---|---|---|---|---|
| | | | | Sulfite | Sulfate | Thiosulfate |
| 1 | 350 | 1/30 | 15 | 31 | (*) | (*) |
| 2 | 350 | 1/30 | 20 | 34 | (*) | (*) |
| 3 | 350 | 1/30 | 45 | 48 | (*) | (*) |
| 4 | 500 | 1/30 | 30 | 72 | 4 | 1 |
| 5 | 500 | 1/30 | 45 | 70 | 5 | 2 |
| 6 | 670 | 1/30 | 20 | 76 | 4 | 2 |
| 7 | 670 | 1/30 | 30 | 87 | 6 | 3 |
| 8 | 670 | 1/30 | 45 | 85 | 9 | 3 |
| 9 | 670 | 1/2 | 15 | 81 | 3 | 6 |
| 10 | 740 | 1/30 | 10 | 69 | 4 | 1 |
| 11 | 740 | 1/30 | 30 | 90 | 7 | 3 |
| 12 | 740 | 1/30 | 30 | 90 | 7 | 3 |
| 13 | 740 | 1/30 | 45 | 85 | 9 | 3 |
| 14 | 1,100 | 1/30 | 10 | 64 | 32 | 2 |
| 15 | 1,100 | 1/2 | 10 | 90 | 5 | 3 |
| 16 | 1,100 | 1/2 | 15 | 87 | 7 | 2 |

*Negligible.

In the runs summarized in Table 2, the amount of smelt was the same in each run and measured 250 parts. The feed smelt had an analysis as listed in Table 1. As can be seen from Table 2, percent conversion to sulfite increased generally with increased temperature. Furthermore, a higher ratio of steam in the fluidizing medium tended to definitely reduce the conversion to sulfate. Generally, it was found that an increase in temperature in the fluidized bed, during which oxidation took place, produced a corresponding increase in conversion to sulfate as well as sulfite. An increase in the proportion of steam in the gaseous fluidizing medium, however, had the beneficial effect of contributing a preferential or selective oxidation to sulfite. This was most convincingly shown from a comparison of Runs 14, 15 and 16. In Run 14, at 1100° F. wherein the fluidizing medium represented a steam/air ratio of 1/30, conversion to sulfate measured 32%. In contrast, Runs 15 and 16, including steam in volumetric ratio of 1 to 2, yielded a large increase in the conversion of the sulfide to sulfite and a significant lowering of the conversion of the sulfide to sulfate.

It has been determined that two factors influence the conversion of the sulfide to sulfite. One of these factors is temperature. Thus, a temperature of at least 350° F. is necessary to achieve a conversion of sulfide to sulfite in the range of 30 to 48%. Most preferably, of course, the temperature of the fluidized bed is controlled to measure at least about 500° F. since the conversion of sulfide to sulfite unexplainedly jumps to about 70% and higher, e.g., 90%. Temperatures in excess of 1100° F.–1200° F. are not particularly beneficial and, in fact, to be avoided since the fluidization efficiency drops rapidly due to agglomeration of the particles which become sticky at such temperatures. Another factor of importance with respect to conversion is the relative volumetric proportion of steam and air as the fluidizing medium. As much as 5 parts by volume of steam per 1 part by volume of air can be employed. However, any increase in steam over this value will favor an increase in the amount of thiosulfate and is therefore not desired. At the other extreme, air alone may be employed as the fluidizing medium, but high conversions (about 70% or higher) will be obtained only where the temperature of the fluidized bed is maintained at a temperature of about 500° F. or higher, preferably higher. In other words, under these conditions the steam/air ratio equals 5/1 to 1/∞.

Preferably, the treatment of the finely divided smelt in the fluidized bed is conducted using a mixture of steam and air as a fluidizing medium; the steam and air being in the relative volumetric ratio ranging from 5.0 to 1.0 parts of steam to 1.0 to 50.0 parts by volume of air.

Better control and more uniform conversion is obtained where the ratio of steam to air is maintained within the following range:

$$\text{Steam/Air} = 2/1 \text{ to } 1/10$$

The optimum in conversion of the sulfide component to sulfite with a minimum of side reactions and by-products such as sulfate and thiosulfate is achieved where the volumetric amount of air predominates as particularly represented by a steam/air volumetric ratio of 1 to 2.

The solidified smelt should preferably be not only in finely divided particulate form, but this particulate solid material should be very uniform in size. Efficiency of fluidization "through-put," achievement of equilibrium and resultant overall optimum conditions with respect to the conversion of the smelt to a product high in sulfite is best served when a major proportion of the particulate solids fall within the range of from about 0.0025 inch to about 0.0125 inch. Ideally, from the standpoint of the optimum in fluidization efficiency and high conversion to sulfite, substantially all of the particulate solids should fall within the aforesaid range.

To achieve fluidization, oxidation and actual movement of the finely divided particles through the fluidized bed, it is necessary that the fluidizing air be at least maintained at minimum velocity depending upon the diameter of the particle. Thus, for a particle 0.002″ in diameter, a superficial air velocity of 0.6 feet per second measured at 70° F. and 14.7 pounds per square inch absolute was sufficient. On the other hand, for a particle 0.006″ in diameter, air velocity must be at least 1.5 feet per second. For a particle diameter 0.010″ in diameter, the velocity must be at least 2.0 feet per second. For a particle 0.020″ in diameter, the air velocity must be at least 3.0 feet per second. The reaction can be conducted either by dilute phase or dense phase.

While specific details of construction have been disclosed herein, it should be appreciated that such is done in compliance with the provisions of the patent statutes requiring disclosure of a preferred embodiment, all obvious equivalents of the foregoing being intended to be included within the scope of the claims unless clearly violative of the language in which the claims are expressed.

We claim:

1. A circulatory system for treating "smelt" resulting from the concentration and combustion of spent pulping liquors as to oxidize the sodium sulfide in said "smelt" into sodium sulfite which comprises:

size reduction means for converting "smelt" solids to a substantially uniformly fine particle size capable of undergoing "fluidization,"
a vertically upstanding, elongate reactor means having a closed bottom end, an upper outlet end and a lateral inlet located near the bottom of said reactor,
solids transfer means connecting with said size reduction means for delivering said finely divided solids to and through said reactor inlet,
second conduit means for a "fluidizing" and oxidizing gas situated within said reactor means and substantially vertically coextensive therewith, said "fluidizing" conduit means having an open outlet end proximate the bottom of said reactor means and beneath the inlet for said solids,
collection means fluidly connected with the upper end of said reactor for receiving and separating solids and gas carried up and out of said reactor, said collection means comprising a chamber having an upper opening for venting "fluidizing" gas and a lower outlet for particulate solids inclusive of sodium sulfite and sodium sulfide, and
means for selectively controlling said collection means outlet to effect selective recirculation of a portion of said collected solids to said reactor means and selective diversion of a portion of said solids to a product reservoir.

2. A system as claimed in claim 1, wherein said outlet end of said second conduit means faces downwardly.

3. A system as claimed in claim 1, wherein said solids transfer means includes a generally elongate horizontal conduit having one end fluidly connecting with said reactor inlet, an internal rotatable screw member and an inlet remote from said one end, said inlet connecting with said size reduction means for reception of fluidizable solids.

4. A circulatory system for effecting oxidation of sodium sulfide, which is present in "smelt" resulting from the concentration, combustion and cooling of spent pulping liquors, into sodium sulfite which comprises:

size reduction means for converting "smelt" solids to a substantially uniform, fine particle size capable of undergoing "fluidization,"
hopper means disposed for reception and temporary storage of said "fluidizable" solids, said hopper means having a lower outlet,
a vertically upstanding elongate reactor means having a bottom end, an upper outlet end and a lateral inlet located near the bottom of said reactor,
lateral conduit means connecting with said lower outlet of said hopper, said conduit including solids transfer means for moving said finely divided solids axially along said conduit means and through said reactor inlet,
second conduit means for a "fluidizing" gas situated within said reactor means and substantially vertically coextensive therewith, said "fluidizing" conduit means having an open outlet end proximate the bottom of said reactor means and beneath the inlet for said solids,
collection means fluidly connected with the upper end of said reactor for receiving and separating solids and gas carried up and out of said reactor, said collection means comprising a chamber having an upper opening for venting "fluidizing" gas and a lower outlet for particulate solids inclusive of sodium sulfite and sodium sulfide, and
means controlling the said lower outlet of said collection means for recirculating a portion of said collected solids to said reactor means and diverting a portion of said collected solids to a product reservoir.

References Cited

UNITED STATES PATENTS

| 2,647,738 | 8/1953 | Trainer | 263—21 |
| 2,805,144 | 9/1957 | Stotler | 75—26 |

JAMES H. TAYMAN, Jr., *Primary Examiner.*

MORRIS O. WOLK, *Examiner.*